June 19, 1973 H. H. BROWN 3,740,295
APPARATUS FOR ADHERING A CUE TIP TO A BILLIARD CUE OR THE LIKE
Filed Dec. 21, 1970
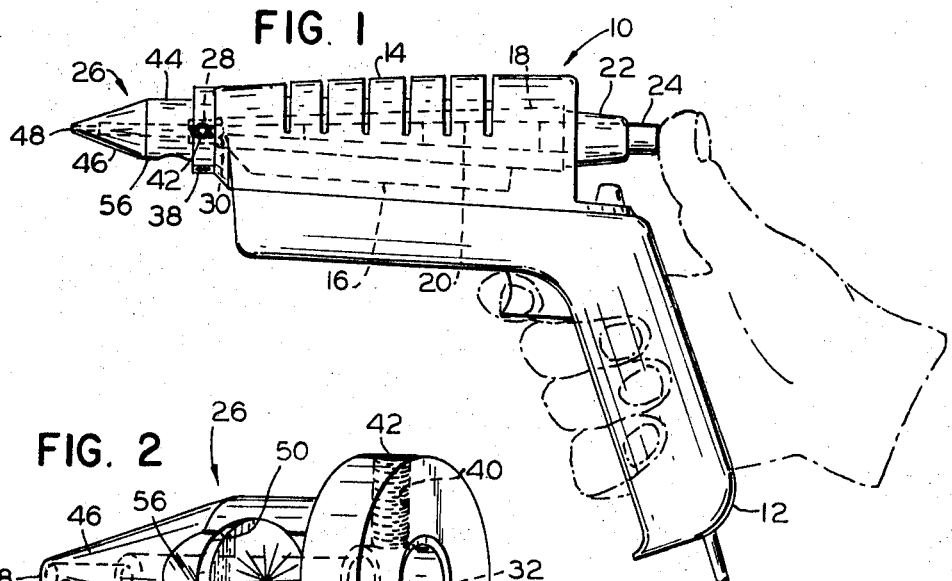
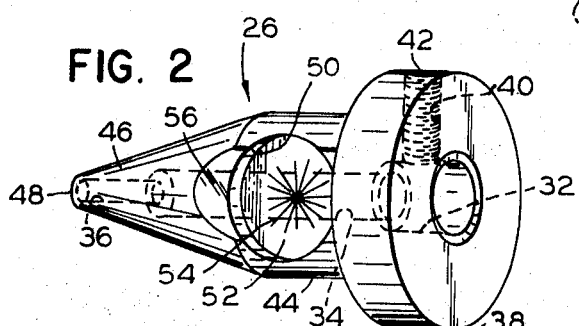
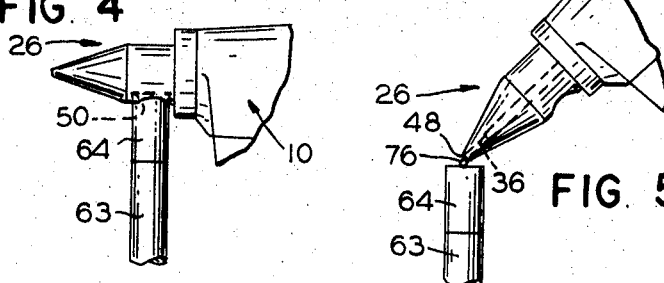
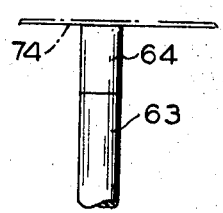
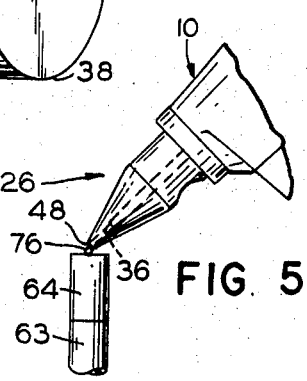
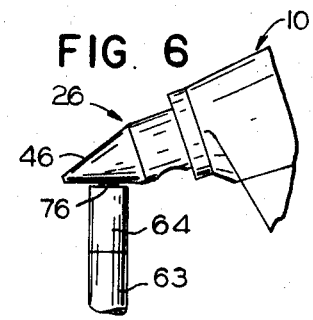
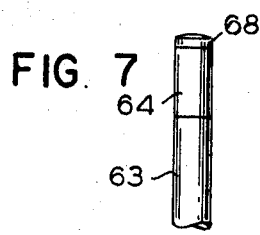
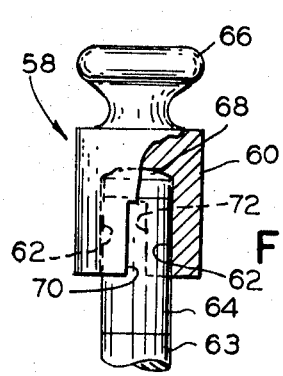
HAROLD H. BROWN
INVENTOR
BY
BUCKHORN, BLORE, KLARQUIST & SPARKMAN
ATTORNEYS Patented June 19, 1973

3,740,295
APPARATUS FOR ADHERING A CUE TIP TO A BILLIARD CUE OR THE LIKE
Harold H. Brown, 1606 NE. 60th,
Vancouver, Wash. 98665
Filed Dec. 21, 1970, Ser. No. 100,182
Int. Cl. B32b *31/00*
U.S. Cl. 156—499                                10 Claims

ABSTRACT OF THE DISCLOSURE

A tool for heating thermoplastic adhesive material to a plastic condition is provided by an elongated frustoconical nozzle by means of which plastic material may be deposited on the end of a billiard cue. The cue end is previously preheated by inserting the same into a recessed socket in the side of the heated nozzle. After deposition of plastic material on the cue end, a cue tip is positioned thereupon and centered employing a tip pilot by means of which pressure also may be exerted between the tip and the cue until the cue tip becomes adhered to the cue.

BACKGROUND OF THE INVENTION

Billiard or pool cues are provided with replaceable cue tips, ordinarily formed of leather, which are typically adhered to the cue ends by means of glue or cement, requiring clamping of the cue tip to the cue end for a period of several hours. This method as used for replacing cue tips is not only expensive and time-consuming, but also the bond produced eventually loses its adhesion resulting in premature loss of the tip.

SUMMARY OF THE INVENTION

In accordance with the present invention, a thermoplastic adhesive material is applied through a heated nozzle to the preheated end of a billiard or pool cue. The billiard or pool cue, which may be preheated with the same tool employed for rendering the adhesive material plastic, is also desirably impressed with an irregular pattern for enhancing the bonding of the adhesive material thereto. After application of plastic adhesive material to the cue end, a cue tip may be placed thereon and the cue tip is centered while mutual pressure is applied between the cue end and the cue tip. After a matter of seconds, the cue tip will be at least partially adhered to the cue end, and no further pressure is necessary.

According to further aspects of the present invention, a frustoconical nozzle is desirably employed in conjunction with a tool for heating the thermoplastic adhesive material, and through which the plastic adhesive material is delivered. The side of the nozzle is provided with means for receiving the end of the cue, prior to deposition of the plastic adhesive material thereon, for preheating the same. This means advantageously includes a recessed socket having a substantially flat bottom and characterized by a relief pattern of rough irregularities by means of which the cue end is roughened prior to application of the adhesive material, whereby the bond is enhanced between the cue end and the plastic material.

A means for centering the tip on the cue desirably comprises a pilot having an open end for receiving the cue end and being closed on the reverse end. A knob, extending axially outwardly from the closed end, can be grasped for exerting pressure on the cue tip as adhered to the cue end.

It is an object of the present invention to provide an improved apparatus for rapidly adhering cue tips to billiard cues or the like.

It is a further object of the present invention to provide an improved portable apparatus for rapidly adhering a cue tip to billard or pool cues, which apparatus requires a minimum of experience in its operation.

It is a further object of the present invention to provide an improved bond between a cue tip and a billiard cue, and for providing said bond in a minimum of time.

It is a further object of the present invention to provide an improved apparatus for bonding a cue tip to a cue with heated thermoplastic material, wherein said method and apparatus affords safety to operating personnel.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

FIG. 1 is a side view of a hand-held gun or tool for heating thermoplastic adhesive material, and a nozzle according to the present invention through which plastic material is deposited upon the end of a billiard or pool cue;

FIG. 2 is a more detailed perspective view of a nozzle according to the present invention further particularly illustrating a recessed socket for preheating the end of the billiard or pool cue and providing a roughened impression thereon;

FIG. 3 illustrates a method step of leveling a cue end, including a ferrule thereon, prior to preheating thereof;

FIG. 4 illustrates a step according to the present invention of preheating a cue end;

FIG. 5 illustrates a further step according to the present invention of depositing plastic material upon a cue end;

FIG. 6 is illustrative of a further step according to the present invention of spreading plastic material with the linear tapered side of a frustoconical portion of a nozzle according to the present invention;

FIG. 7 illustrates the positioning of the cue tip on a cue end; and

FIG. 8 is a side view, partially broken away, of a centering pilot according to the present invention employed for centering a cue tip on a cue end and for exerting pressure between the cue tip and the cue.

DETAILED DESCRIPTION

Referring to the drawings, and particularly to FIG. 1, a hand-held gun or tool 10 is illustrated for heating thermoplastic adhesive material to a reasonably high temperature for bringing about plastic flow thereof. The tool 10 includes a hand grip 12 and a barrel portion 14 housing an electric heating element 16 in conductive relation with a metal barrel 18 provided with a tapered interior bore 20. The larger end of barrel 18, at the hand grip end of the tool, is provided with a Teflon inlet tube 22 into which sticks of substantially solid adhesive material 24 are inserted. A plurality of such sticks of thermoplastic adhesive have been inserted into the tool as illustrated in FIG. 1, with each stick secured to the preceding one along the interior of barrel 18. In feeding the tool, a stick of thermoplastic adhesive material is first inserted through inlet tube 22, a second stick is touched to the heated nozzle 26 for partly melting the end thereof, and the melted end is advanced through inlet tube 22 whereby it will adhere to the trailing end of the preceding stick. As can be seen in FIG. 1, the sticks of thermoplastic adhesive material become narrower as they are forced down the barrel 18 due to the taper of bore 20. At the forward end of the tool, the barrel 18 includes a tubular outlet 28 housing a ball valve indicated at 30 wherein a ball is urged to the right against a seat by means not shown. The operator presses his thumb against the last stick 24 of adhesive material, and such material, heated to a plastic state by the heating element, will be forced past ball valve 30 and will be emitted from tubular outlet 28. The hand-held gun or tool 10 for heating the thermoplastic adhesive material is known in the art, and details of the gun are not important to, nor do they form part of, the present invention. The gun or tool 10 may comprise a model 250 or a model 204 "Thermogrip" electric glue gun as manufactured by United Shoe Machinery Company, Reading, Pa. The thermoplastic adhesive material is suitably a polyethylene based hot-melt adhesive as known in the art. A suitable material is No. 6390 adhesive also sold by United Shoe Machinery Company. This material is extruded in a molten plastic state by the gun or tool 10 at temperatures ranging from 225° F. to 450° F. The heating element 16 of the tool 10 is therefore adapted for raising the material to such temperature.

According to the present invention, tool 10 is provided with nozzle 26 adapted for use in securing cue tips to billiard or pool cues. The nozzle 26 is illustrated in greater detail in FIG. 2, wherein the nozzle has been rotated by ninety degrees for more clearly illustrating certain portions thereof. The nozzle 26 is fairly long, and formed of a good heat conductive metal, suitably aluminum. It has a three-part axial bore comprising a larger portion 32 to be received over tubular outlet 28 of tool 10, a central portion 34 of smaller diameter, and a third portion 36 of yet smaller diameter at the tip end of the nozzle. The nozzle includes a radial flange 38 which is suitably provided with a threaded hole 40 at right angles to bore portion 32 for receiving a set screw 42 employed for securing the nozzle to tubular outlet 28. The center portion 44 of the nozzle is cylindrical and of smaller diameter, while a third tip portion 46 constitutes a frustum of a cone having the same diameter as portion 44 where it joins the latter. The tip portion 46 tapers linearly to a flat tip 48 having the exit of bore portion 36 centrally located therein.

The nozzle is also provided with a recessed socket extending inwardly toward the axis of the nozzle, at right angles to such axis, from the exterior of cylindrical center portion 44 of the nozzle. The recessed socket is substantially cylindrical, and is suitably provided with a substantially flat bottom 52. In diameter, the socket is larger than the largest cue end to which it is desired to secure a tip. As will hereinafter be more fully explained, this socket is employed for preheating the cue end, thereby facilitating the adherence of the thermoplastic material, and the cue tip, to the cue end.

For additionally enhancing the adherence of the thermoplastic adhesive material and the cue tip to the cue end, substantially flat bottom 52 of the socket is desirably provided with a relief pattern 54. This relief pattern suitably comprises an indented pattern of irregularities which are at least partially somewhat sharp and which may project slightly upwardly from the bottom surface. These rough irregularities accomplish a roughening, or provide the impression of a complementary pattern in the end of the cue end or plastic ferrule at the end of a billiard cue when the cue end is urged into socket 50 for preheating. In the particular illustrated embodiment, pattern 54 comprises a configuration of fairly sharp grooves and/or ridges crossing at the center of the substantially flat bottom 52, forming a figure having a star-like appearance or shape. Such a pattern is conveniently formed with a chisel, and will provide complementary points or ridges on the cue end or ferrule heated thereagainst. The pattern is desirably heat treated so as to be sufficiently hard for maintaining the irregularity thereof on bottom 52.

The side of center portion 44 where socket 50 is located is desirably milled to provide a flat surface 56 from which socket 50 may be started. As illustrated, this flat surface 56 is longer than the diameter of socket 50, i.e. in the axial direction of the nozzle, but need not be as wide as socket 50, in a direction perpendicular to the first. The socket 50 provides a distinct advantage as compared, for example, with merely employing flat side 56 for preheating a cue end. The nozzle 26 is heated to a temperature well in excess of 200° F., and recessed socket 50 allows the placement of the cue end perpendicularly against a heated surface of the nozzle, without the danger of the cue end slipping out and resulting in possible injury or burning of either the cue or the tool operator. Moreover, the cue end is more satisfactorily centered on a pattern 54 with the recessed socket. Of course, it is understood the centering the cue end need not be exact with respect to pattern 54. The recessing of the socket may also help speed the heating of the cue end.

Another important element according to the present invention comprises tip pilot 58 illustrated in FIG. 8. This tip pilot comprises a hollow substantially cylindrical metal body 60 suitably formed of aluminum and having an interior bore 62 just slightly larger than the outside of the cue end, e.g. as covered by plastic ferrule 64. The pilot 58 is closed at its reverse end, and provided with a knob 66 extending axially outwardly (here upwardly) from the closed end. The knob is adapted to be grasped for exerting pressure toward cue tip 68 disposed upon the cue end as hereinafter more fully described. The pilot is further provided with a pair of longitudinal side slots, 70 and 72, one located diametrically opposite the other, useful for removing any residual adhesive from the pilot after use thereof.

Considering the method according to the present invention for securing a cue tip to a billiard or pool cue, reference is first made to FIG. 3. Pool cue 63 is suitably provided with plastic or ceramic ferrule 64 at the tip end or cue end thereof. When the term "cue end" is employed herein, it is meant to include the aforementioned ferrule where provided. The cue end is first desirably cleaned thoroughly, and the ends of the cue and ferrule are rendered flush. This is suitably accomplished by means of the sander disc indicated in outline at 74 in FIG. 3. Old glue and the like are thereby removed. The flat side of a new cue tip should be similarly sanded for lightly roughening the same. The tool 10 is electrically energized for operating heating element 16, and thermoplastic adhesive material is inserted as illustrated in FIG. 1, and as hereinbefore described in connection therewith. The heating element of the tool or gun is operated long enough for thoroughly heating the adhesive material to a molten or plastic state whereby the plastic adhesive material may be ejected from tip end 48 of the nozzle through bore portion 36 when pressure is exerted upon a stick of thermoplastic adhesive material at the rear end of the gun. Since nozzle 26 is secured to tubular outlet 26 of the tool, it will be raised to substantially the same high temperature as is barrel 18 by action of heating element 16. With the nozzle 26 so heated, the tool is hand-held, and cue 63 is disposed for urging the cue end into recessed socket 50 as illustrated in FIG. 4. Some mutual pressure is exerted between the cue and tool 10 so that not only will the cue end be heated to nearly the temperature of nozzle 26, but also so the cue end may at least partially take on a roughened pattern complementary to the pattern 54 at the end of the socket, for enhancing the bonding of an adhesive material thereto. Even though mutual pressure is exerted, the cue end is not likely to slip out of placement because of the recessing of the socket opening.

The preheating of the cue end in the above-described manner is of importance in that it allows more "working time" or "set" time for the thermoplastic adhesive material and results in a stronger weld. The adhesive wetting of the bonding surfaces is increased.

Immediately after the cue end has been raised to a suitably high temperature, advantageously near that of the nozzle 26, tool 10 is employed for emitting a drop 76 of adhesive material in a plastic state through bore portion 36. That is, a slight pressure is exerted with the thumb against a stick 24 of the thermoplastic adhesive material as hereinbefore described so that a small quantity or drop 76 is centrally deposited upon the cue end. No more than a drop is ordinarily necessary. Now, the cue tip 68, usually formed of leather, may be immediately placed with the fingers upon the cue end as illustrated in FIG. 7. Alternatively, the linearly tapered side of frustoconical section 46 of the nozzle may be used for spreading or centering the drop 76 of plastic material as illustrated in FIG. 6. This alternative may also be employed for heating the plastic material if, for some reason, the cue tip 78 is not immediately placed upon the drop of plastic material. Since the nozzle has a flat or linear taper, it can be advantageously applied over the flat surface of the cue end for spreading the adhesive.

Immediately after placement of the cue tip 78 upon the cue end, the tip pilot 58 is placed over the cue tip and cue end as illustrated in FIG. 8. The knob 66 is grasped with the fingers and a pressure is exerted in the direction of the cue tip for about thirty seconds. This pressure should be firm hand pressure, but need not be excessive. Not only will a firm flat bond be made between the cue tip and the cue end, and with the cue tip properly oriented, but also the pilot centers the cue tip with respect to the cue, i.e. so the center of the cue tip is aligned with the longitudinal axis of the cue. Several different sizes of pilots 58 are desirable for fairly closely receiving different sizes of cues whereby each cue tip and cue end are fairly closely received therewithin in order to achieve accurate centering. As can be seen in FIG. 8, the upper end of the bore 62 is desirably rounded or beveled in order that it may receive the upper end of cue tip 68.

As an alternative to first placing cue tip 68 upon the cue end with the drop of plastic material therebetween, and then employing the pilot 58, the process may be reversed. Thus, the cue tip may be first located in pilot 58, and the cue end with the drop of plastic material thereupon may be urged downwardly against the cue tip. As a further alternative, the drop of plastic material may be placed upon the cue tip before the cue end is urged thereagainst. The process is otherwise the same.

It is sometimes necessary to sand or remove excess adhesive material after the tip is secured to the cue. It is desirable to let the cue set for a few seconds before such sanding or trimming is accomplished. Any excess thermoplastic material left in pilot 58 can be removed with a small knife inserted through slot 70 or slot 72.

There is thus provided in accordance with the present invention an advantageous method and apparatus for quickly and securely bonding a cue tip to a billiard or pool cue. The bonding achieved is quite secure although no lenghty period of clamping the cue tip in place is required. Moreover, the bonding can be accomplished safely by relatively inexperienced personnel.

While I have shown and described a preferred embodiment of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. In combination with a tool for heating thermoplastic adhesive material, said tool having a heating element for elevating the temperature of said tool thereby causing heating of said thermoplastic material, a metal nozzle for attachment to said tool in heat conducting relation therewith to experience an elevated temperature in response thereto, said nozzle having an interior bore for receiving plastic adhesive material from said tool and having an outlet for delivering said plastic adhesive material to the end of a billiard cue for the purpose of adhering a cue tip thereto, said nozzle being provided with means at the side thereof experiencing substantially the same elevated temperature as said nozzle for receiving the end of a billiard cue prior to deposition of plastic adhesive material thereon from the outlet of said nozzle whereby to preheat the end of said billiard cue for enhancing subsequent adherence of adhesive material and the cue tip thereto, said means having a substantially planar surface at the side of said nozzle against which the end of the billiard cue is disposed in contacting abutting relation for preheating the same.

2. The apparatus according to claim 1 wherein at least a portion of said nozzle has the shape of an elongated cone with a substantially linear outside taper adapted for spreading plastic adhesive material after deposition thereof on a cue end, said flat surface being located rearwardly of said elongated cone toward said tool.

3. In further combination with the apparatus according to claim 1, a tip pilot comprising a hollow cylindrical member having an interior bore of a diameter slightly larger than the outside diameter of said cue end, said pilot having a first open end for receiving said cue end and being closed on the reverse end, and a knob extending axially outwardly from said closed end adapted to be grasped for exerting pressure on a cue tip adhered to said cue end by means of adhesive material from said nozzle.

4. In combination with a tool for heating thermoplastic adhesive material, said tool having a heating element for elevating the temperature of said tool thereby causing heating of said thermoplastic material, a metal nozzle for attachment to said tool in heat conducting relation therewith to experience an elevated temperature in response thereto, said nozzle having an interior bore for receiving plastic adhesive material from said tool and having an outlet for delivering said plastic material to the end of a billiard cue for the purpose of adhering a cue tip thereto, said nozzle being provided with means at the side thereof experiencing substantially the same elevated temperature as said nozzle for receiving the end of a billiard cue prior to deposition of plastic adhesive material thereon from the outlet of said nozzle whereby to preheat the end of said billiard cue for enhancing subsequent adherence of adhesive material and the cue tip thereto, wherein said means at the side of said nozzle for receiving and heating the end of said billiard cue comprises a portion of said nozzle provided with a recessed socket for receiving the end of said billiard cue.

5. The apparatus according to claim 4 wherein said socket is provided with a relief pattern for impressing the same into the cue end so as to improve the adherence of the plastic material and the cue tip thereto.

6. The combination according to claim 4 wherein said nozzle includes a frustoconical portion and a cylindrical portion located between said frustoconical portion and said tool having the same outside diameter as the frustoconical portion where it joins the frustoconical portion, and means for securing said cylindrical portion to the outlet means of said tool, said recessed socket extending inwardly from the outer surface of said cylindrical portion at substantially right angles to the axis of said cylindrical portion.

7. In combination with a tool for melting thermoplastic adhesive material, said tool having a heating element for heating said tool and melting said thermoplastic adhesive material, said tool having an outlet means where said thermoplastic material is emitted, a metal nozzle having an interior bore with a portion adapted to be received in heat conducting connection over said outlet means of said tool, said nozzle having a frustoconical portion terminating in an outlet for said interior bore of said nozzle, said nozzle being heated by the heating element of said tool by virtue of the connection to the said outlet means of said tool and receiving plastic adhesive material therefrom for application to a billiard cue end for the purpose of securing a cue tip to said cue end, said nozzle having a substantially flat bottomed recessed socket on a side thereof for receiving and heating the billiard cue end prior to application of plastic adhesive material thereto.

8. The combination according to claim 7 wherein the substantially flat bottom of said recessed socket is provided with a relief pattern of rough irregularities to provide for roughening of the end of said cue end, when the same is heated in said recessed socket, so as to improve the adherence of plastic adhesive material and the cue tip thereto.

9. In further combination with the apparatus according to claim 7, a tip pilot comprising a hollow cylindrical member having an interior bore of a diameter slightly larger than the outside diameter of said cue end, said pilot having a first open end for receiving said cue end and being closed on the reverse end, and a knob extending axially outwardly from said closed end adapted to be grasped for exerting pressure on a cue tip adhered to said cue end by means of adhesive material from said nozzle.

10. The apparatus according to claim 9 wherein said pilot is provided with a pair of longitudinal side slots for removing any residual adhesive material from the interior bore thereof.

References Cited
UNITED STATES PATENTS

| | | | |
|---|---|---|---|
| 3,279,971 | 10/1966 | Gardener | 156—322 X |
| 2,556,609 | 6/1951 | Arkless | 156—500 X |
| 2,979,234 | 4/1961 | Kamborian | 156—500 X |

WILLIAM D. MARTIN, Primary Examiner

T. G. DAVIS, Assistant Examiner

U.S. Cl. X.R.

156—322